US012260816B2

(12) United States Patent
Zhang et al.

(10) Patent No.: US 12,260,816 B2
(45) Date of Patent: Mar. 25, 2025

(54) PIXEL CIRCUIT, DRIVING METHOD AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yi Zhang, Beijing (CN); Ming Hu, Beijing (CN); Huijuan Yang, Beijing (CN); Tingliang Liu, Beijing (CN); Kai Zhang, Beijing (CN); Haijun Qiu, Beijing (CN); Youngyik Ko, Beijing (CN); Tinghua Shang, Beijing (CN); Biao Liu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/017,234

(22) PCT Filed: Jan. 29, 2022

(86) PCT No.: PCT/CN2022/074964

§ 371 (c)(1),
(2) Date: Jan. 20, 2023

(87) PCT Pub. No.: WO2023/142034

PCT Pub. Date: Aug. 3, 2023

(65) Prior Publication Data

US 2024/0249680 A1 Jul. 25, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2320/0233;
(Continued)

(56) References Cited

U.S. PATENT DOCUMENTS 10,276,098 B2 * 4/2019 Gai ...................... G09G 3/3233
2018/0211601 A1 7/2018 Chen et al.
(Continued)

FOREIGN PATENT DOCUMENTS

CN 106504703 A 3/2017
CN 109087609 A * 12/2018 ........... G09G 3/3208
(Continued)

*Primary Examiner* — Ricardo Osorio
(74) *Attorney, Agent, or Firm* — IPro, PLLC

(57) ABSTRACT

Provided are a pixel circuit, a driving method and a display apparatus, including: a light emitting device; a driving transistor, configured to produce a current for driving the light emitting device to emit light according to a data voltage; a voltage control circuit, coupled to the driving transistor, wherein the voltage control circuit is configured to reset the driving transistor (M0) and input the data voltage in response to a loaded signal; and a light emitting control circuit, coupled to the driving transistor and the light emitting device, wherein the light emitting control circuit is configured to provide the current produced by the driving transistor to the light emitting device; wherein a frequency of resetting the driving transistor is not less than a frequency of inputting the data voltage.

18 Claims, 8 Drawing Sheets

(52) U.S. Cl.
CPC ............... *G09G 2320/0233* (2013.01); *G09G 2320/0247* (2013.01); *G09G 2330/021* (2013.01); *G09G 2340/0435* (2013.01)

(58) Field of Classification Search
CPC ..... G09G 2320/0247; G09G 2330/021; G09G 2340/0435; G09G 3/3208; G09G 3/3258
See application file for complete search history.

(56) References Cited

U.S. PATENT DOCUMENTS

| | | | | |
|---|---|---|---|---|
| 2019/0295473 | A1 | 9/2019 | Lu et al. | |
| 2020/0111418 | A1 | 4/2020 | Nam et al. | |
| 2021/0319755 | A1* | 10/2021 | Kim ..................... | G09G 3/3233 |
| 2023/0094230 | A1* | 3/2023 | Noh ..................... | G09G 3/2096<br>345/690 |
| 2023/0142259 | A1 | 5/2023 | Liu et al. | |

FOREIGN PATENT DOCUMENTS

| | | | | | |
|---|---|---|---|---|---|
| CN | 110364120 | A | | 10/2019 | |
| CN | 112037714 | A | * | 12/2020 | |
| CN | 113380180 | A | | 9/2021 | |
| CN | 113516950 | A | | 10/2021 | |
| CN | 113870789 | A | | 12/2021 | |
| CN | 113889030 | A | | 1/2022 | |
| CN | 113950715 | A | * | 1/2022 | ........... G09G 3/3233 |
| KR | 20210153387 | A | | 12/2021 | |

* cited by examiner

PIXEL CIRCUIT, DRIVING METHOD AND DISPLAY APPARATUS

CROSS-REFERENCE TO RELATED APPLICATIONS

This application is a National Stage of International Application No. PCT/CN2022/074964, filed Jan. 29, 2022, which is hereby incorporated by reference in its entirety.

FIELD

The present disclosure relates to the technical field of display, in particular to a pixel circuit, a driving method and a display apparatus.

BACKGROUND

Light emitting devices L such as an organic light emitting diode (OLED), a quantum dot light emitting diode (QLED), a micro light emitting diode (Micro LED) and a mini light emitting diode (Mini LED) have the advantages of self-illumination, low energy consumption and the like, and are one of hotspots in the current application research field of display apparatuses. Generally, a pixel circuit is adopted in a display apparatus to drive the light emitting devices L to emit light.

SUMMARY

A pixel circuit provided by an embodiment of the present disclosure includes:

- a light emitting device; a driving transistor, configured to produce a current for driving the light emitting device to emit light according to a data voltage; a voltage control circuit, coupled to the driving transistor, wherein the voltage control circuit is configured to reset the driving transistor and input the data voltage in response to a loaded signal; and a light emitting control circuit, coupled to the driving transistor and the light emitting device, wherein the light emitting control circuit is configured to provide the current produced by the driving transistor to the light emitting device, wherein a frequency of resetting the driving transistor is not less than a frequency of inputting the data voltage.

In some examples, the voltage control circuit is further configured to provide a fixed voltage loaded by a data signal end to the driving transistor in response to a signal loaded by a first control signal end, reset the driving transistor and provide a data voltage loaded by the data signal end to the driving transistor in response to signals loaded by the first control signal end and a second control signal end.

In some examples, when the pixel circuit works at a current refresh frequency among a plurality of different refresh frequencies, a refresh frequency corresponding to the signal loaded by the first control signal end is a set refresh frequency, and a refresh frequency corresponding to the signal of the second control signal end is the current refresh frequency, wherein the set refresh frequency is not less than the current refresh frequency.

In some examples, the pixel circuit further includes a first reset circuit and a second reset circuit; the first reset circuit is configured to reset a gate of the driving transistor in response to a signal of a third control signal end; and the second reset circuit is configured to reset an anode of the light emitting device in response to a signal of a fourth control signal end.

In some examples, when the pixel circuit works at a current refresh frequency among a plurality of different refresh frequencies, a refresh frequency corresponding to the signal loaded by the fourth control signal end is a set refresh frequency, and a refresh frequency corresponding to the signal of the third control signal end is the current refresh frequency, wherein the set refresh frequency is not less than the current refresh frequency.

In some examples, the current refresh frequency is less than a maximum refresh frequency among the plurality of different refresh frequencies; and the set refresh frequency is greater than the current refresh frequency.

In some examples, a current display frame of the pixel circuit working at the current refresh frequency is divided into a plurality of consecutive sub-display frames, the first sub-display frame of the plurality of sub-display frames is defined as a refresh sub-frame, and the remaining sub-display frames are defined as holding sub-frames; in the refresh sub-frame, the signal loaded by the first control signal end includes an active level and an inactive level; the signal loaded by the second control signal end includes an active level and an inactive level; the signal loaded by the third control signal end includes an active level and an inactive level; and the signal loaded by the fourth control signal end includes an active level and an inactive level, wherein in the refresh sub-frame, when the signal loaded by the first control signal end is the active level, the signal loaded by the second control signal end is the inactive level, the signal loaded by the third control signal end is the active level and the signal loaded by the fourth control signal end is the active level, the voltage control circuit is configured to reset the driving transistor, and the second reset circuit is configured to reset the anode of the light emitting device; when the signal loaded by the first control signal end is the active level, the signal loaded by the second control signal end is the active level, the signal loaded by the third control signal end is the inactive level and the signal loaded by the fourth control signal end is the active level, the voltage control circuit is configured to input the data voltage loaded by the data signal end, and the second reset circuit is configured to reset the anode of the light emitting device; and when the signal loaded by the first control signal end is the inactive level, the signal loaded by the second control signal end is the inactive level, the signal loaded by the third control signal end is the inactive level and the signal loaded by the fourth control signal end is the inactive level, the light emitting control circuit is configured to provide the current produced by the driving transistor to the light emitting device.

In some examples, in the holding sub-frames, the signal loaded by the first control signal end includes an active level and an inactive level; the signal loaded by the second control signal end includes an inactive level; the signal loaded by the third control signal end includes an inactive level; and the signal loaded by the fourth control signal end includes an active level and an inactive level, wherein in the holding sub-frames, when the signal loaded by the first control signal end is the active level, the signal loaded by the second control signal end is the inactive level, the signal loaded by the third control signal end is the inactive level and the signal loaded by the fourth control signal end is the active level, the voltage control circuit is configured to reset the driving transistor, and the second reset circuit is configured to reset the anode of the light emitting device; and when the signal loaded by the first control signal end is the inactive level, the signal loaded by the second control signal end is the inactive level, the signal loaded by the third control signal end is the inactive level and the signal loaded by the fourth control signal end is the inactive level, the light emitting control circuit is configured to provide the current produced by the driving transistor to the light emitting device.

In some examples, the voltage control circuit includes: a first transistor, a second transistor and a storage capacitor; a gate of the first transistor is coupled to the first control signal end, a first electrode of the first transistor is coupled to the data signal end, and a second electrode of the first transistor is coupled to a second electrode of the driving transistor; a gate of the second transistor is coupled to the second control signal end, a first electrode of the second transistor is coupled to the gate of the driving transistor, and a second electrode of the second transistor is coupled to a first electrode of the driving transistor; and a first electrode plate of the storage capacitor is coupled to a first power end, and a second electrode plate of the storage capacitor is coupled to the gate of the driving transistor.

In some examples, the light emitting control circuit includes: a third transistor and a fourth transistor; a gate of the third transistor is coupled to a light emitting control signal end, a first electrode of the third transistor is coupled to the first power end, and a second electrode of the third transistor is coupled to the first electrode of the driving transistor; and a gate of the fourth transistor is coupled to the light emitting control signal end, a first electrode of the fourth transistor is coupled to the second electrode of the driving transistor, and a second electrode of the fourth transistor is coupled to the light emitting device.

In some examples, the first reset circuit includes: a fifth transistor, wherein a gate of the fifth transistor is coupled to the third control signal end, a first electrode of the fifth transistor is coupled to a first initialization signal end, and a second electrode of the fifth transistor is coupled to the gate of the driving transistor; and the second reset circuit includes: a sixth transistor, wherein a gate of the sixth transistor is coupled to the fourth control signal end, a first electrode of the sixth transistor is coupled to a second initialization signal end, and a second electrode of the sixth transistor is coupled to the light emitting device.

In some examples, the first control signal end and the fourth control signal end are the same signal end.

In some examples, a material of an active layer of the transistors in the pixel circuit includes at least one of a metal oxide semiconductor material and a low temperature polysilicon semiconductor material.

An embodiment of the present disclosure further provides a display apparatus, including the above pixel circuit.

An embodiment of the present disclosure further provides a driving method of the above pixel circuit, including: resetting, by a voltage control circuit, a driving transistor in response to a loaded signal; inputting, by the voltage control circuit, a data voltage in response to a loaded signal; and providing, by a light emitting control signal end, a current produced by the driving transistor to a light emitting device, wherein a frequency of resetting the driving transistor is not less than a frequency of inputting the data voltage.

DETAILED DESCRIPTION OF THE EMBODIMENTS

Figure 1:
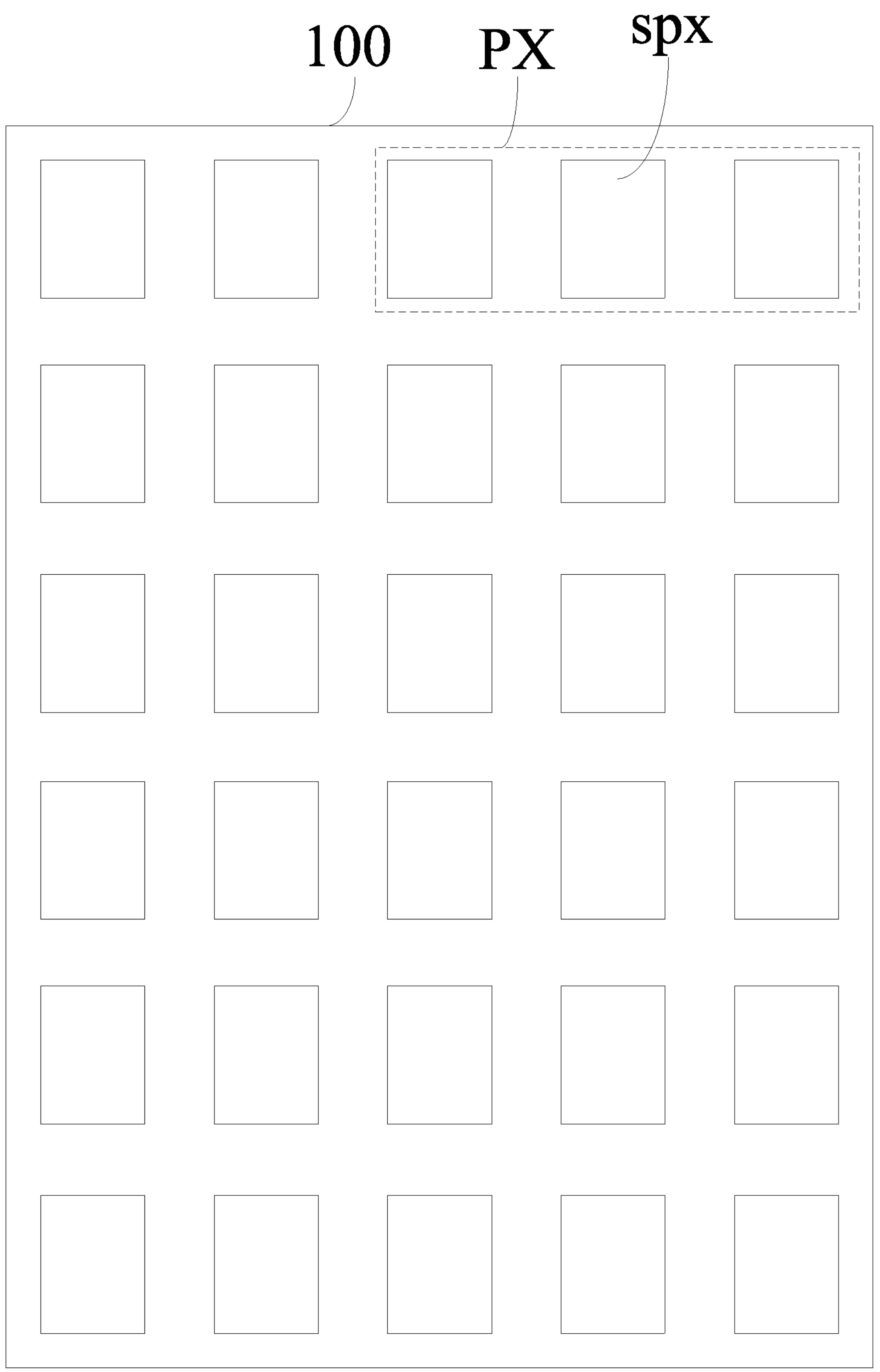
FIG. 1 is a schematic structural diagram of a display apparatus provided by an embodiment of the present disclosure.

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. The words "first", "second" and the like used in the present disclosure do not indicate any order, quantity or importance, but are only configured to distinguish different components. The words "comprise" or "include" or the like indicate that an element or item appearing before such words covers listed elements or items appearing after the words and equivalents thereof, and does not exclude other elements or items. The words "connect" or "couple" or the like are not limited to physical or mechanical connection, but may include electrical connection, whether direct or indirect.

It needs to be noted that the sizes and shapes of all figures in the accompanying drawings do not reflect true scales, and are only intended to schematically illustrate the content of the present disclosure. The same or similar reference numerals represent the same or similar elements or elements with the same or similar functions all the time.

As shown in FIG. 1, a display apparatus provided by an embodiment of the present disclosure may include: a display panel 100, a display region of the display panel 100 includes a plurality of pixel units PX distributed in an array, and the pixel units PX may include a plurality of sub-pixels spx. Exemplarily, each pixel unit includes a plurality of sub-pixels spx. For example, the pixel units may include red sub-pixels, green sub-pixels and blue sub-pixels, and therefore red, green and blue may be mixed to achieve color display. Or, each pixel unit may also include red sub-pixels, green sub-pixels, blue sub-pixels and white sub-pixels, and therefore red, green, blue and white may be mixed to achieve color display. Of course, in practical applications, a light emitting color of the sub-pixels in the pixel units may be designed and determined according to practical application environments, which is not limited here.

In some embodiments of the present disclosure, each sub-pixel may include a pixel circuit, and the pixel circuit has a light emitting device L and a driving transistor M0 producing a current for driving the light emitting device L to emit light. The current produced by the driving transistor M0 may be input to an anode of the light emitting device L, and a corresponding voltage is loaded on a cathode of the light emitting device L, so that the light emitting device L may be driven to emit light.

In order to achieve different application scenarios, the display apparatus may set a plurality of different refresh frequencies. For example, taking an example that the display apparatus has a 120 Hz refresh frequency, a 90 Hz refresh frequency, a 60 Hz refresh frequency, a 30 Hz refresh frequency, a 10 Hz refresh frequency and a 1 Hz refresh frequency, in some application scenarios, in order to save power consumption, it is required that the display panel conducts displaying with the frequency lowered, for example: lowered from 120 Hz to 30 Hz. In some other scenarios, for example: when a high-frequency game is executed, the frequency of the display panel needs to be increased, for example: increased from 60 Hz to 90 Hz or 120 Hz, so that pictures are smoother. Therefore, in order to adapt to different scenarios, the display apparatus may transform the refresh frequency, namely, performing dynamic frame frequency displaying.

However, during driving the display apparatus to display pictures with a low refresh frequency (for example, 120 Hz is a maximum refresh frequency, and 90 Hz, 60 Hz, 30 Hz, 10 Hz and 1 Hz may be low refresh frequencies), different sub-pixels have the situation that the driving transistors M0 are inconsistent in gate-source voltage and source-drain voltage, which will lead to the problem that the different sub-pixels are different in hysteresis.

Some embodiments of the present disclosure provides the pixel circuit, the driving transistor M0 may be reset through a voltage control circuit 10, and a frequency of resetting the driving transistor M0 is not less than a frequency of inputting a data voltage, so that the problem that the different sub-pixels are different in hysteresis may be alleviated.

Figure 2:
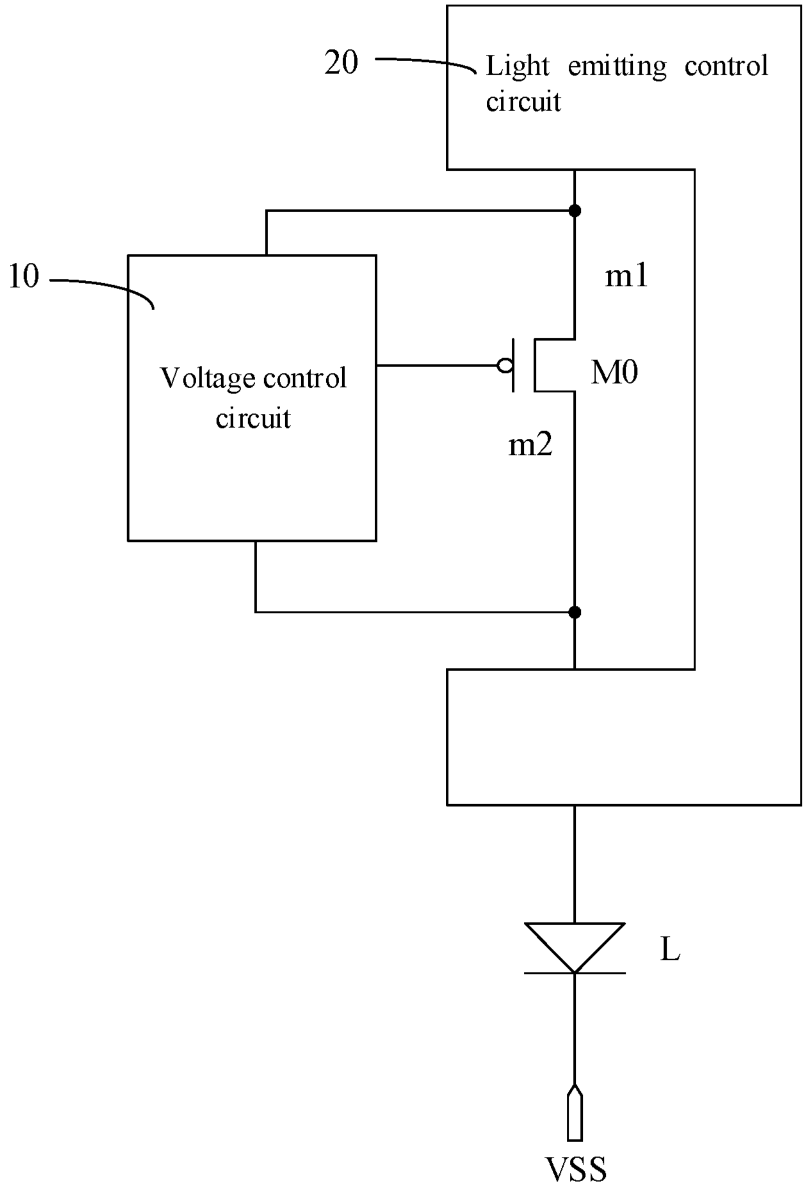
FIG. 2 is some schematic structural diagrams of a pixel circuit provided by an embodiment of the present disclosure.

As shown in FIG. 2, the pixel circuit provided by the embodiment of the present disclosure may include: the light emitting device L, the driving transistor M0, the voltage control circuit 10 and a light emitting control circuit 20. The voltage control circuit 10 is coupled to the driving transistor M0, and the light emitting control circuit 20 is coupled to the driving transistor M0 and the light emitting device L. The driving transistor M0 may be configured to produce the current for driving the light emitting device L to emit light according to the data voltage. The voltage control circuit 10 is configured to reset the driving transistor M0 and input the data voltage in response to a loaded signal. The light emitting control circuit 20 is configured to provide the current produced by the driving transistor M0 to the light emitting device L. The frequency of resetting the driving transistor M0 is not less than the frequency of inputting the data voltage. Therefore, the problem that the different sub-pixels are different in hysteresis may be alleviated.

Figure 4:
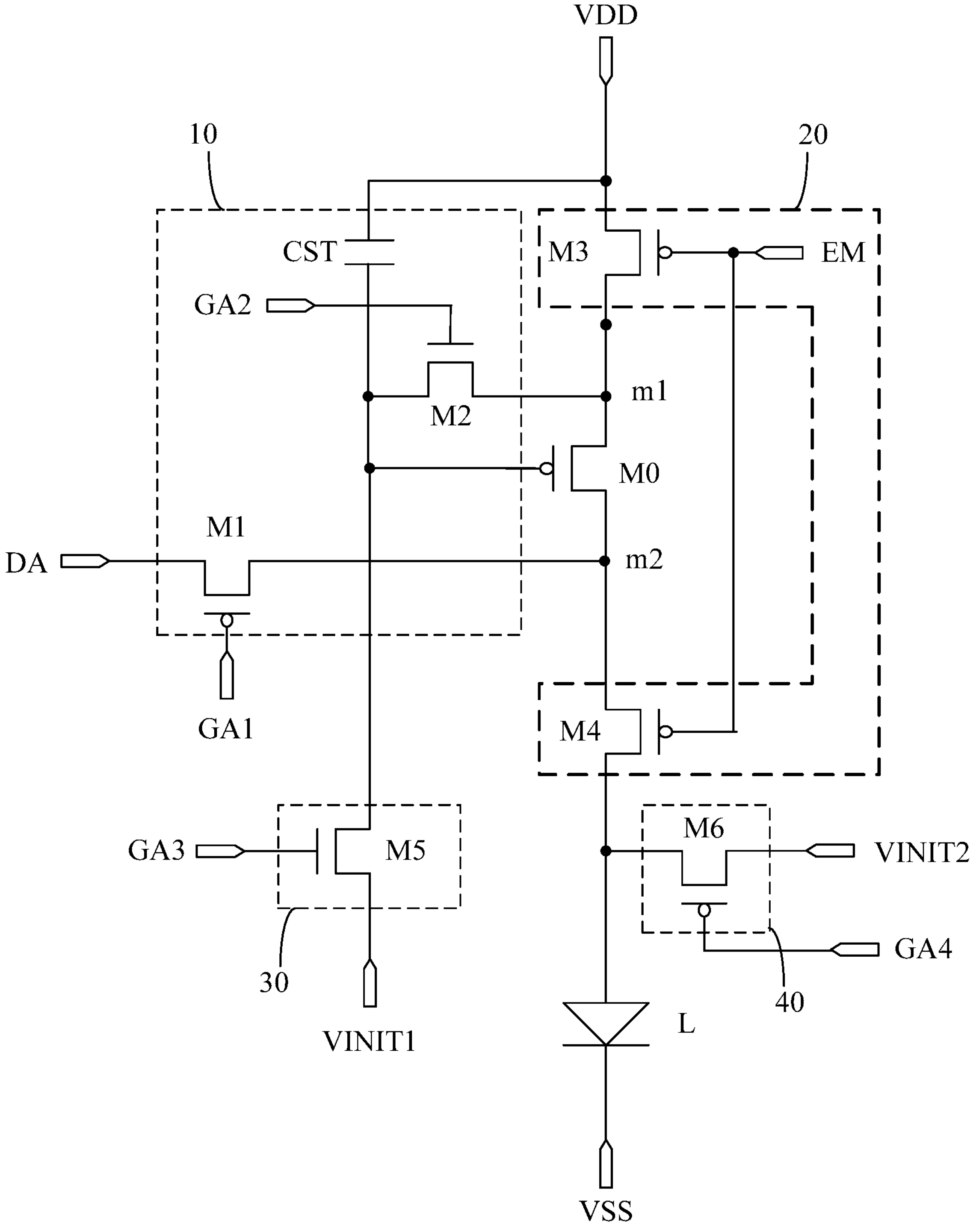
FIG. 4 is some specific schematic structural diagrams of a pixel circuit provided by an embodiment of the present disclosure.

In some embodiments of the present disclosure, as shown in FIG. 4 the voltage control circuit 10 may be coupled to a first control signal end GA1, a data signal end DA, a second control signal end GA2, a gate of the driving transistor M0, a first electrode of the driving transistor M0 and a second electrode of the driving transistor M0. The voltage control circuit 10 may be further configured to provide a fixed voltage loaded by the data signal end DA to the driving transistor M0 in response to a signal loaded by the first control signal end GA1, reset the driving transistor M0 and provide a data voltage loaded by the data signal end DA to the driving transistor M0 in response to signals loaded by the first control signal end GA1 and the second control signal end GA2.

In some embodiments of the present disclosure, as shown in FIG. 4 the light emitting control circuit 20 may be coupled to a first power end VDD, a light emitting control signal end EM, the first electrode of the driving transistor M0, the second electrode of the driving transistor M0 and the anode of the light emitting device L. Moreover, the light emitting control circuit 20 may be further configured to conduct the first power end VDD with the first electrode of the driving transistor M0, conduct the second electrode of the driving transistor M0 with the anode of the light emitting device L and provide the current produced by the driving transistor M0 to the light emitting device L in response to a signal loaded by the light emitting control signal end EM. Moreover, the cathode of the light emitting device L is coupled to a second power end VSS.

Figure 3:
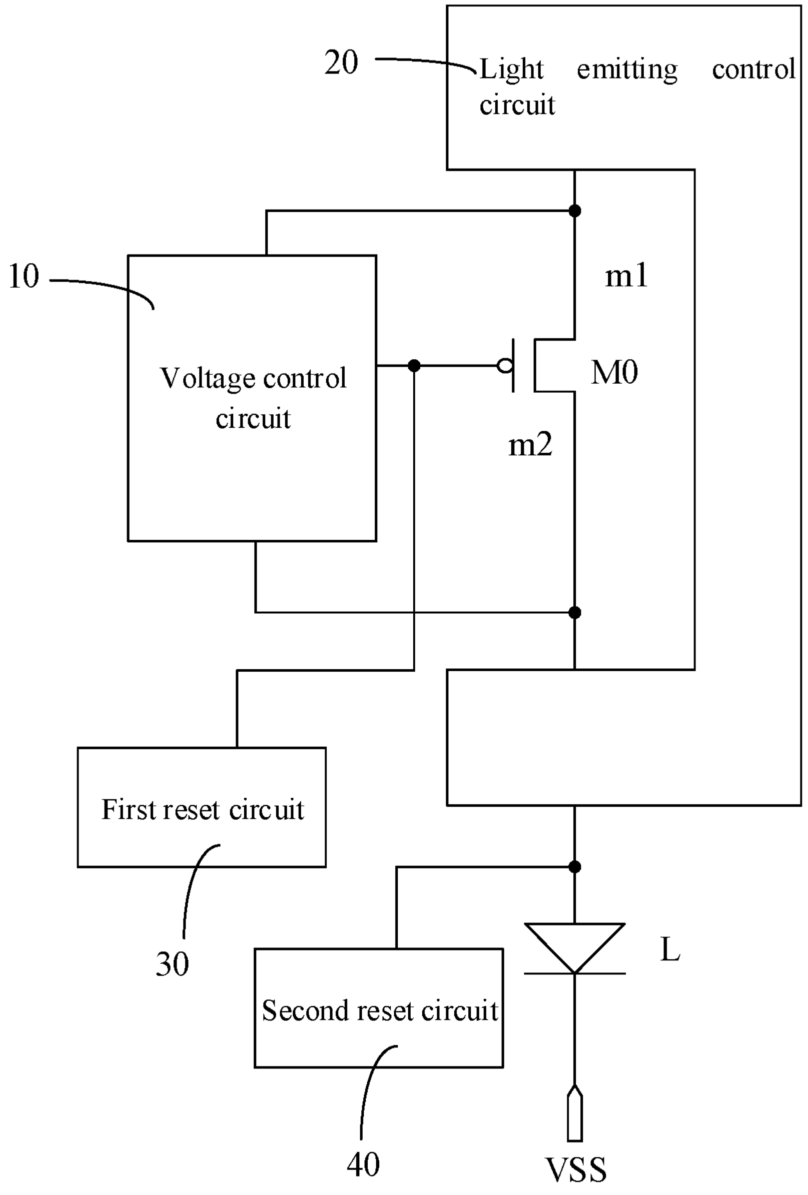
FIG. 3 is some other schematic structural diagrams of a pixel circuit provided by an embodiment of the present disclosure.

In some embodiments of the present disclosure, as shown in FIG. 3 and FIG. 4, the pixel circuit may further include a first reset circuit 30. The first reset circuit 30 may be coupled to a third control signal end GA3 and the gate of the driving transistor M0. The first reset circuit 30 is configured to reset the gate of the driving transistor M0 in response to a signal loaded by the third control signal end GA3.

In some embodiments of the present disclosure, as shown in FIG. 3 and FIG. 4, the pixel circuit may further include a second reset circuit 40. The second reset circuit 40 may be coupled to a fourth control signal end GA4 and the anode of the light emitting device L. The second reset circuit 40 is configured to reset the anode of the light emitting device L in response to a signal loaded by the fourth control signal end GA4.

The present disclosure is described in detail below in conjunction with a specific embodiment. It should be noted that the present embodiment is only for better explaining the present disclosure, without limiting the present disclosure.

In some embodiments of the present disclosure, as shown in FIG. 4, the driving transistor M0 may be set as a P-type transistor. The first electrode m1 of the driving transistor M0 may be used as a drain thereof, and the second electrode m2 of the driving transistor M0 may be used as a source thereof. When the driving transistor M0 is in a saturated state, a current flows from the drain m1 of the driving transistor M0 to the source m2 thereof. Generally, the light emitting device L emits light under the action of the current produced when the driving transistor M0 is in the saturated state. Of course, in the embodiment of the present disclosure, it is described only by taking an example that the driving transistor M0 is the P-type transistor, and for the case that the driving transistor M0 is an N-type transistor, the design principle is the same as the present disclosure, which also belongs to the scope of protection of the present disclosure.

In some embodiments of the present disclosure, one of the first power end VDD and the second power end VSS may be a high-voltage end, and the other one may be a low-voltage end. For example, in the embodiment as shown in FIG. 4, the first power end VDD may load a constant first voltage Vdd, and the first voltage Vdd is a positive voltage. The second power end VSS may load a constant second voltage Vss, and the second voltage Vss is a negative voltage or grounded etc.

In some embodiments of the present disclosure, the light emitting device L may be at least one of an OLED, a QLED, a Micro LED or a Mini LED. Exemplarily, the light emitting device L may include the anode, a light emitting layer and the cathode which are arranged in a stacked manner. Further, the light emitting layer may also include a hole injection layer, a hole transport layer, an electron transport layer, an electron injection layer and other film layers. Of course, in practical applications, the specific structure of the light emitting device L may be determined according to the requirements of the practical applications, which is not limited here.

In some embodiments of the present disclosure, as shown in FIG. 4, the voltage control circuit 10 may include: a first transistor M1, a second transistor M2 and a storage capacitor. A gate of the first transistor M1 is coupled to the first control signal end GA1, a first electrode of the first transistor M1 is coupled to the data signal end DA, and a second electrode of the first transistor M1 is coupled to the second electrode of the driving transistor M0. A gate of the second transistor M2 is coupled to the second control signal end GA2, a first electrode of the second transistor M2 is coupled to the gate of the driving transistor M0, and a second electrode of the second transistor M2 is coupled to the first electrode of the driving transistor M0. A first electrode plate of the storage capacitor is coupled to the first power end VDD, and a second electrode plate of the storage capacitor is coupled to the gate of the driving transistor M0.

Exemplarily, the first transistor M1 may be conducted under the control of an active level of the signal loaded by the first control signal end GA1, and may be cut off under the control of an inactive level of the signal loaded by the first control signal end GA1. For example, as shown in FIG. 4, the first transistor M1 is a P-type transistor, and then the active level of the signal loaded by the first control signal end GA1 is a low level, while the inactive level is a high level. If the first transistor M1 is an N-type transistor, the active level of the signal loaded by the first control signal end GA1 is a high level, while the inactive level is a low level.

Exemplarily, the second transistor M2 may be conducted under the control of an active level of the signal loaded by the second control signal end GA2, and may be cut off under the control of an inactive level of the signal loaded by the second control signal end GA2. For example, as shown in FIG. 4, the second transistor M2 is an N-type transistor, and then the active level of the signal loaded by the second control signal end GA2 is a high level, while the inactive level is a low level. If the second transistor M2 is a P-type transistor, the active level of the signal loaded by the first control signal end GA1 is a low level, while the inactive level is a high level.

Exemplarily, the storage capacitor may store voltages input to the first electrode plate and the second electrode plate thereof.

In some embodiments of the present disclosure, as shown in FIG. 4, the light emitting control circuit 20 includes: a third transistor M3 and a fourth transistor M4. A gate of the third transistor M3 is coupled to the light emitting control signal end EM, a first electrode of the third transistor M3 is coupled to the first power end VDD, and a second electrode of the third transistor M3 is coupled to the first electrode of the driving transistor M0. A gate of the fourth transistor M4 is coupled to the light emitting control signal end EM, a first electrode of the fourth transistor M4 is coupled to the second electrode of the driving transistor M0, and a second electrode of the fourth transistor M4 is coupled to the light emitting device L.

Exemplarily, the third transistor M3 may be conducted under the control of an active level of a signal loaded by the light emitting control signal end EM, and may be cut off under the control of an inactive level of the signal loaded by the light emitting control signal end EM. For example, as shown in FIG. 4, the third transistor M3 is a P-type transistor, and then the active level of the signal loaded by the light emitting control signal end EM is a low level, while the inactive level is a high level. If the third transistor M3 is an N-type transistor, the active level of the signal loaded by the light emitting control signal end EM is a high level, while the inactive level is a low level.

Exemplarily, the fourth transistor M4 may be conducted under the control of the active level of the signal loaded by the light emitting control signal end EM, and may be cut off under the control of the inactive level of the signal loaded by the light emitting control signal end EM. For example, as shown in FIG. 4, the fourth transistor M4 is a P-type transistor, and then the active level of the signal loaded by the light emitting control signal end EM is a low level, while the inactive level is a high level. If the fourth transistor M4 is an N-type transistor, the active level of the signal loaded by the light emitting control signal end EM is a high level, while the inactive level is a low level.

In some embodiments of the present disclosure, as shown in FIG. 4, the first reset circuit 30 includes: a fifth transistor M5. A gate of the fifth transistor M5 is coupled to the third control signal end GA3, a first electrode of the fifth transistor M5 is coupled to a first initialization signal end VINIT1, and a second electrode of the fifth transistor M5 is coupled to the gate of the driving transistor M0.

Exemplarily, the fifth transistor M5 may be conducted under the control of an active level of a signal loaded by the third control signal end GA3, and may be cut off under the control of an inactive level of the signal loaded by the third control signal end GA3. For example, as shown in FIG. 4, the fifth transistor M5 is an N-type transistor, and then the active level of the signal loaded by the third control signal end GA3 is a high level, while the inactive level is a low level. If the fifth transistor M5 is a P-type transistor, the active level of the signal loaded by the first control signal end GA1 is a low level, while the inactive level is a high level.

In some embodiments of the present disclosure, as shown in FIG. 4, the second reset circuit 40 includes: a sixth transistor M6. A gate of the sixth transistor M6 is coupled to the fourth control signal end GA4, a first electrode of the sixth transistor M6 is coupled to a second initialization signal end VINIT2, and a second electrode of the sixth transistor M6 is coupled to the light emitting device L.

Exemplarily, the sixth transistor M6 may be conducted under the control of an active level of a signal loaded by the fourth control signal end GA4, and may be cut off under the control of an inactive level of the signal loaded by the fourth control signal end GA4. For example, as shown in FIG. 4, the sixth transistor M6 is a P-type transistor, and then the active level of the signal loaded by the fourth control signal end GA4 is a low level, while the inactive level is a high level. If the sixth transistor M6 is an N-type transistor, the active level of the signal loaded by the fourth control signal end GA4 is a high level, while the inactive level is a low level.

Exemplarily, the signals loaded by the first control signal end GA1 and the fourth control signal end GA4 may be made the same, and thus resetting of the driving transistor M0 and resetting of the anode of the light emitting device L may be performed at the same time to further reduce the problems of hysteresis and flickering.

Generally, a transistor adopting a low temperature poly-silicon (LTPS) semiconductor material as an active layer is high in mobility and may be made thinner and smaller and lower in power consumption. In the embodiment of the present disclosure, a material of an active layer of each transistor in the pixel circuit may be the low temperature poly-silicon semiconductor material, that is, these transistors are set to be LTPS transistors.

Generally, a transistor adopting a metal oxide semiconductor material as an active layer is small in leak current. In order to lower a leak current of the gate G of the driving transistor M0, in the embodiment of the present disclosure, the material of the active layer of each transistor in the pixel circuit may also be the metal oxide semiconductor material, that is, these transistors are set to be oxide thin film transistors. For example, the metal oxide semiconductor material may be an indium gallium zinc oxide (IGZO). Of course, the material of the active layer may also be other materials capable of implementing the scheme of the present disclosure, which is not limited here.

In some embodiments of the present disclosure, the manner that the transistors adopting the metal oxide semiconductor material as the active layers and the transistors adopting the LTPS semiconductor material as the active layers are combined may be adopted, in this way, the material of the active layers of a part of the transistors in the pixel circuit may be the metal oxide semiconductor material, and the material of the active layers of the remaining transistors in the pixel circuit may be the low temperature poly-silicon semiconductor material. Exemplarily, the material of the active layers of the second transistor M2 and the fifth transistor M5 may be the metal oxide semiconductor material, that is, both the second transistor M2 and the fifth transistor M5 are set as the oxide thin film transistors, in this way, the second transistor M2 and the fifth transistor M5 may be small in leak current, and thus a voltage at the gate of the driving transistor M0 may be kept to be further in a stable state. The material of the active layers of the first transistor M1, the third transistor M3, the fourth transistor M4, the sixth transistor M6 and the driving transistor M0 may be set as the low temperature poly-silicon material, that is, the first transistor M1, the third transistor M3, the fourth transistor M4, the sixth transistor M6 and the driving transistor M0 are all set as the LTPS transistors, and in this way, the first transistor M1, the third transistor M3, the fourth transistor M4, the sixth transistor M6 and the driving transistor M0 may be made high in mobility and may be made thinner and smaller and lower in power consumption. In this way, the LTPO pixel circuit made of a low temperature polycrystalline oxide is prepared by combining two transistor preparing processes of the LTPS transistors and the oxide thin film transistors, and thus the leak current of the gate of the driving transistor M0 may be made small, and the power consumption is low. Therefore, the pixel circuit is applied to the display panel, and the uniformity of display may be guaranteed while the display panel conducts displaying with a lowered refresh frequency.

It should be noted that, the process of preparing the transistors by adopting low temperature poly-silicon as the active layers may be the same as a process of preparing the LTPS transistors in the prior art, which is not repeated here. The process of preparing the transistors by adopting the metal oxide semiconductor material as the active layers may be the same as a process of preparing the oxide thin film transistors in the prior art, which is not repeated here.

It should be noted that, in some embodiments of the present disclosure, the first electrodes of the first transistor M1 to the sixth transistor M6 may be sources thereof, and the second electrodes may be drains thereof; or the first electrodes may be the drains thereof, and the second electrodes may be the sources thereof, which may be determined according to the requirements of practical applications.

The specific structures of the voltage control circuit 10, the light emitting control circuit 20, the first reset circuit 30 and the second reset circuit 40 above in the pixel circuit provided by the embodiment of the present disclosure are only exemplified, and during specific implementation, the specific structures of the voltage control circuit 10, the light emitting control circuit 20, the first reset circuit 30 and the second reset circuit 40 are not limited to the above structures provided by the embodiment of the present disclosure, and may also be other structures known to those skilled in the art, which is not limited here.

In an embodiment of the present disclosure, a driving method of the above pixel circuit may include: a voltage control circuit 10 resets a driving transistor M0 in response to a loaded signal. The voltage control circuit 10 inputs a data voltage in response to a loaded signal. A light emitting control signal end EM provides a current produced by the driving transistor M0 to a light emitting device L. A frequency of resetting the driving transistor M0 is not less than a frequency of inputting the data voltage.

In some embodiments of the present disclosure, when the pixel circuit works at a current refresh frequency among a plurality of different refresh frequencies, a refresh frequency corresponding to a signal loaded by a first control signal end GA1 is a set refresh frequency, and a refresh frequency corresponding to a signal of a second control signal end GA2 is a current refresh frequency. The set refresh frequency is not less than the current refresh frequency. Exemplarily, taking an example that the pixel circuit works at a 120 Hz refresh frequency, a 90 Hz refresh frequency, a 60 Hz refresh frequency, a 30 Hz refresh frequency, a 10 Hz refresh frequency and a 1 Hz refresh frequency, if the current refresh frequency is 60 Hz, the set refresh frequency may be 120 Hz or 90 Hz. If the current refresh frequency is 90 Hz, the set refresh frequency may be 120 Hz. It should be noted that, an active level of the signal loaded by the first control signal end GA1 may be loaded according to the set refresh frequency, an active level of the signal loaded by the second control signal end GA2 may be loaded according to the current refresh frequency, since the set refresh frequency is not less than the current refresh frequency, a frequency of the active level in the signal loaded by the first control signal end GA1 is not less than a frequency of the active level in the signal loaded by the second control signal end GA2, and thus when the pixel circuit works at a low refresh frequency, the number of times of resetting a first electrode of the driving transistor M0 may be increased, and the problem of hysteresis is further alleviated. When the pixel circuit works at different refresh frequencies, a refresh frequency corresponding to the signal loaded by the first control signal end GA1 is the set refresh frequency, that is, the refresh frequency corresponding to the signal loaded by the first control signal end GA1 is uniform, and thus a brightness difference between the different refresh frequencies may be reduced.

In some embodiments of the present disclosure, when the pixel circuit works at the current refresh frequency among the plurality of different refresh frequencies, a refresh frequency corresponding to a signal loaded by a fourth control signal end GA4 is the set refresh frequency, a refresh frequency corresponding to a signal loaded by the light emitting control signal end EM is the set refresh frequency, and a refresh frequency corresponding to a signal of a third control signal end GA3 is the current refresh frequency. The set refresh frequency is not less than the current refresh frequency. Exemplarily, taking an example that the pixel circuit works at a 120 Hz refresh frequency, a 90 Hz refresh frequency, a 60 Hz refresh frequency, a 30 Hz refresh frequency, a 10 Hz refresh frequency and a 1 Hz refresh frequency, if the current refresh frequency is 60 Hz, the set refresh frequency may be 120 Hz or 90 Hz. If the current refresh frequency is 90 Hz, the set refresh frequency may be 120 Hz. It should be noted that, an active level of the signal loaded by the fourth control signal end GA4 may be loaded according to the set refresh frequency, an active level of the signal loaded by the light emitting control signal end EM may be loaded according to the set refresh frequency, an active level of the signal loaded by the third control signal end GA3 may be loaded according to the current refresh frequency, since the set refresh frequency is not less than the current refresh frequency, a frequency of the active level in the signal loaded by the fourth control signal end GA4 is equal to a frequency of the active level in the signal loaded by the first control signal end GA1, and thus when the pixel circuit works at a low refresh frequency, resetting the first electrode of the driving transistor M0 and resetting an anode of the light emitting device L may be performed at the same time, so that not only can the problem of hysteresis be alleviated, but also the problem of flickering between the different refresh frequencies may be alleviated.

In some embodiments of the present disclosure, the current refresh frequency may be made less than a maximum refresh frequency in the plurality of different refresh frequencies, and the set refresh frequency may be made greater than the current refresh frequency.

Exemplarily, taking an example that the pixel circuit works at a 120 Hz refresh frequency, a 90 Hz refresh frequency, a 60 Hz refresh frequency, a 30 Hz refresh frequency, a 10 Hz refresh frequency and a 1 Hz refresh frequency, if the current refresh frequency is 60 Hz, the set refresh frequency may be 120 Hz or 90 Hz. If the current refresh frequency is 90 Hz, the set refresh frequency may be 120 Hz. Alternatively, the set refresh frequency may be equal to the current refresh frequency. For example, if the current refresh frequency is 60 Hz, the set refresh frequency may be 120 Hz. If the current refresh frequency is 90 Hz, the set refresh frequency may be 120 Hz. In this way, when the pixel circuit works at other refresh frequencies than the maximum refresh frequency, that is, the pixel circuit works at a low refresh frequency, the number of times of resetting the first electrode of the driving transistor M0 may be increased, and the problem of hysteresis is further alleviated.

In some embodiments of the present disclosure, the current refresh frequency may be made to be 1/n of the maximum refresh frequency, where n is an integer greater than 1. For example, the maximum refresh frequency is 120 Hz, and then the current refresh frequency may be 60 Hz, or 40 Hz, or 30 Hz, or 10 Hz or 1 Hz. For example, the maximum refresh frequency is 90 Hz, and then the current refresh frequency may be 45 Hz, or 30 Hz, or 10 Hz or 1 Hz.

When the current refresh frequency is equal to the maximum refresh frequency, the set refresh frequency may be made to be equal to the maximum refresh frequency. For example, if the current refresh frequency is 120 Hz, the set refresh frequency may be 120 Hz. Alternatively, the set refresh frequency may also be made to be greater than the maximum refresh frequency. For example, the maximum refresh frequency is 120 Hz, the set refresh frequency may be set as 240 Hz, and at the moment, the set refresh frequency may be obtained via processing by a timing controller in a display apparatus according to the maximum refresh frequency.

Figure 5A:
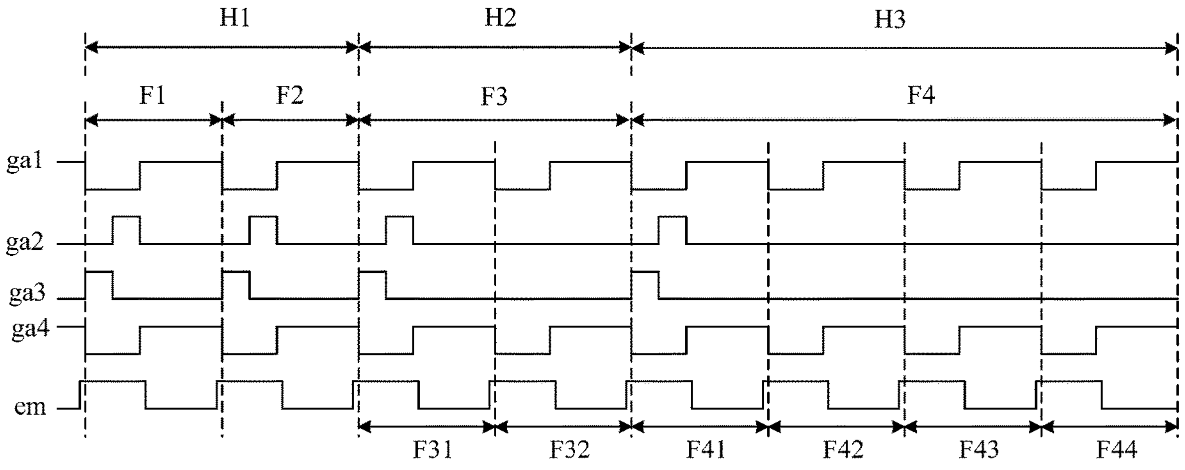
FIG. 5A is some signal sequence diagrams provided by an embodiment of the present disclosure.

In some embodiments of the present disclosure, taking an example that the pixel circuit works at a 120 Hz refresh frequency, a 90 Hz refresh frequency, a 60 Hz refresh frequency, a 30 Hz refresh frequency, a 10 Hz refresh frequency and a 1 Hz refresh frequency, in combination with FIG. 5A, F1 represents a display frame of the first picture, F2 represents a display frame of the second picture, F3 represents a display frame of the third picture, and F4 represents a display frame of the fourth picture. For example, the set refresh frequency is set as the maximum refresh frequency (e.g., 120 Hz), and if the current refresh frequency H1 corresponding to the display frames F1-F2 is the maximum refresh frequency, then in the display frames F1-F2, the signal ga1 loaded by the first control signal end GA1 may be a signal corresponding to 120 Hz, so as to control conducting and cut-off of a first transistor M1. The signal ga4 loaded by the fourth control signal end GA4 may also be a signal corresponding to 120 Hz, so as to control conducting and cut-off of a sixth transistor M6. The signal em loaded by the light emitting control signal end EM is also a signal corresponding to 120 Hz, so as to control conducting and cut-off of a third transistor M3 and a fourth transistor M4. The signal ga2 loaded by the second control signal end GA2 is also a signal corresponding to 120 Hz, so as to control conducting and cut-off of a second transistor M2. The signal ga3 loaded by the third control signal end GA3 is also a signal corresponding to 120 Hz, so as to control conducting and cut-off of a fifth transistor M5. In this way, in the display frame F1, the first transistor M1 to the sixth transistor M6 may be each controlled to be conducted once. In the display frame F2, the first transistor M1 to the sixth transistor M6 may also be each controlled to be conducted once.

The current refresh frequency H2 corresponding to the display frame F3 is 60 Hz, and then in the display frame F3, the signal ga1 loaded by the first control signal end GA1 may be a signal corresponding to 120 Hz, so as to control conducting and cut-off of the first transistor M1. The signal ga4 loaded by the fourth control signal end GA4 may also be a signal corresponding to 120 Hz, so as to control conducting and cut-off of the sixth transistor M6. The signal em loaded by the light emitting control signal end EM is also a signal corresponding to 120 Hz, so as to control conducting and cut-off of the third transistor M3 and the fourth transistor M4. The signal ga2 loaded by the second control signal end GA2 is a signal corresponding to 60 Hz, so as to control conducting and cut-off of the second transistor M2. The signal ga3 loaded by the third control signal end GA3 is also a signal corresponding to 60 Hz, so as to control conducting and cut-off of the fifth transistor M5. In this way, in the display frame F3, the first transistor M1 and the sixth transistor M6 may be each controlled to be conducted twice, the third transistor M3 and the fourth transistor M4 may be each controlled to be cut off twice, and the second transistor M2 and the fifth transistor M5 may be each controlled to be conducted once. In this way, after a high refresh frequency is switched to a low refresh frequency, by increasing the number of times of controlling the first transistor M1 and the sixth transistor M6 to be conducted, a switching frequency of the light emitting device L between light emitting and resetting may be increased, and thus the problem of flickering may be effectively alleviated.

The current refresh frequency H3 corresponding to the display frame F4 is 30 Hz, and then in the display frame F4, the signal ga1 loaded by the first control signal end GA1 may be a signal corresponding to 120 Hz, so as to control conducting and cut-off of the first transistor M1. The signal ga4 loaded by the fourth control signal end GA4 may also be a signal corresponding to 120 Hz, so as to control conducting and cut-off of the sixth transistor M6. The signal em loaded by the light emitting control signal end EM is also a signal corresponding to 120 Hz, so as to control conducting and cut-off of the third transistor M3 and the fourth transistor M4. The signal ga2 loaded by the second control signal end GA2 is a signal corresponding to 30 Hz, so as to control conducting and cut-off of the second transistor M2. The signal ga3 loaded by the third control signal end GA3 is also a signal corresponding to 30 Hz, so as to control conducting and cut-off of the fifth transistor M5. In this way, in the display frame F4, the first transistor M1 and the sixth transistor M6 may be each controlled to be conducted four times, the third transistor M3 and the fourth transistor M4 may be each controlled to be cut off four times, and the second transistor M2 and the fifth transistor M5 may be each controlled to be conducted once. In this way, after a high refresh frequency is switched to a low refresh frequency, by increasing the number of times of controlling the first transistor M1 and the sixth transistor M6 to be conducted, a switching frequency of the light emitting device L between light emitting and resetting may be increased, and thus the problem of flickering may be effectively alleviated.

Of course, in the display frame F3 and the display frame F4, a second scanning signal ga2 may also be a signal corresponding to other refresh frequencies, which is not limited here.

In some embodiments of the present disclosure, a current display frame of the pixel circuit working at the current refresh frequency may be divided into a plurality of consecutive sub-display frames, the first sub-display frame of the plurality of sub-display frames is defined as a refresh sub-frame, and the remaining sub-display frames are defined as holding sub-frames. Exemplarily, in the same display frame, all the sub-display frames are the same in maintaining duration. Optionally, in the same display frame, the refresh sub-frame is located in front of all the holding sub-frames.

In some embodiments of the present disclosure, in the refresh sub-frame, the signal loaded by the first control signal end GA1 includes an active level and an inactive level; the signal loaded by the second control signal end GA2 includes an active level and an inactive level; the signal loaded by the third control signal end GA3 includes an active level and an inactive level; and the signal loaded by the fourth control signal end GA4 includes an active level and an inactive level. In the holding sub-frames, the signal loaded by the first control signal end GA1 includes an active level and an inactive level; the signal loaded by the second control signal end GA2 includes an inactive level; the signal loaded by the third control signal end GA3 includes an inactive level; and the signal loaded by the fourth control signal end GA4 includes an active level and an inactive level. In the refresh sub-frame, when the signal loaded by the first control signal end is the active level, the signal loaded by the second control signal end is the inactive level, the signal loaded by the third control signal end is the active level and the signal loaded by the fourth control signal end is the active level, the voltage control circuit is configured to reset the driving transistor, and a second reset circuit is configured to reset the anode of the light emitting device. When the signal loaded by the first control signal end is the active level, the signal loaded by the second control signal end is the active level, the signal loaded by the third control signal end is the inactive level and the signal loaded by the fourth control signal end is the active level, the voltage control circuit is configured to input the data voltage loaded by a data signal end, and the second reset circuit is configured to reset the anode of the light emitting device. When the signal loaded by the first control signal end is the inactive level, the signal loaded by the second control signal end is the inactive level, the signal loaded by the third control signal end is the inactive level and the signal loaded by the fourth control signal end is the inactive level, the light emitting control circuit is configured to provide the current produced by the driving transistor to the light emitting device.

In some embodiments of the present disclosure, in the holding sub-frames, when the signal loaded by the first control signal end is the active level, the signal loaded by the second control signal end is the inactive level, the signal loaded by the third control signal end is the inactive level and the signal loaded by the fourth control signal end is the active level, the voltage control circuit is configured to reset the driving transistor, and the second reset circuit is configured to reset the anode of the light emitting device. In this way, the hysteresis effect may be relieved by resetting a second electrode of the driving transistor in the holding sub-frames. When the pixel circuit is applied to different refresh frequencies, the brightness difference between the different refresh frequencies may be reduced, and the problem of flickering may be alleviated. In the holding sub-frames, when the signal loaded by the first control signal end is the inactive level, the signal loaded by the second control signal end is the inactive level, the signal loaded by the third control signal end is the inactive level and the signal loaded by the fourth control signal end is the inactive level, the light emitting control circuit is configured to provide the current produced by the driving transistor to the light emitting device. In this way, a picture may continue to be displayed in the holding sub-frames.

Figure 5B:
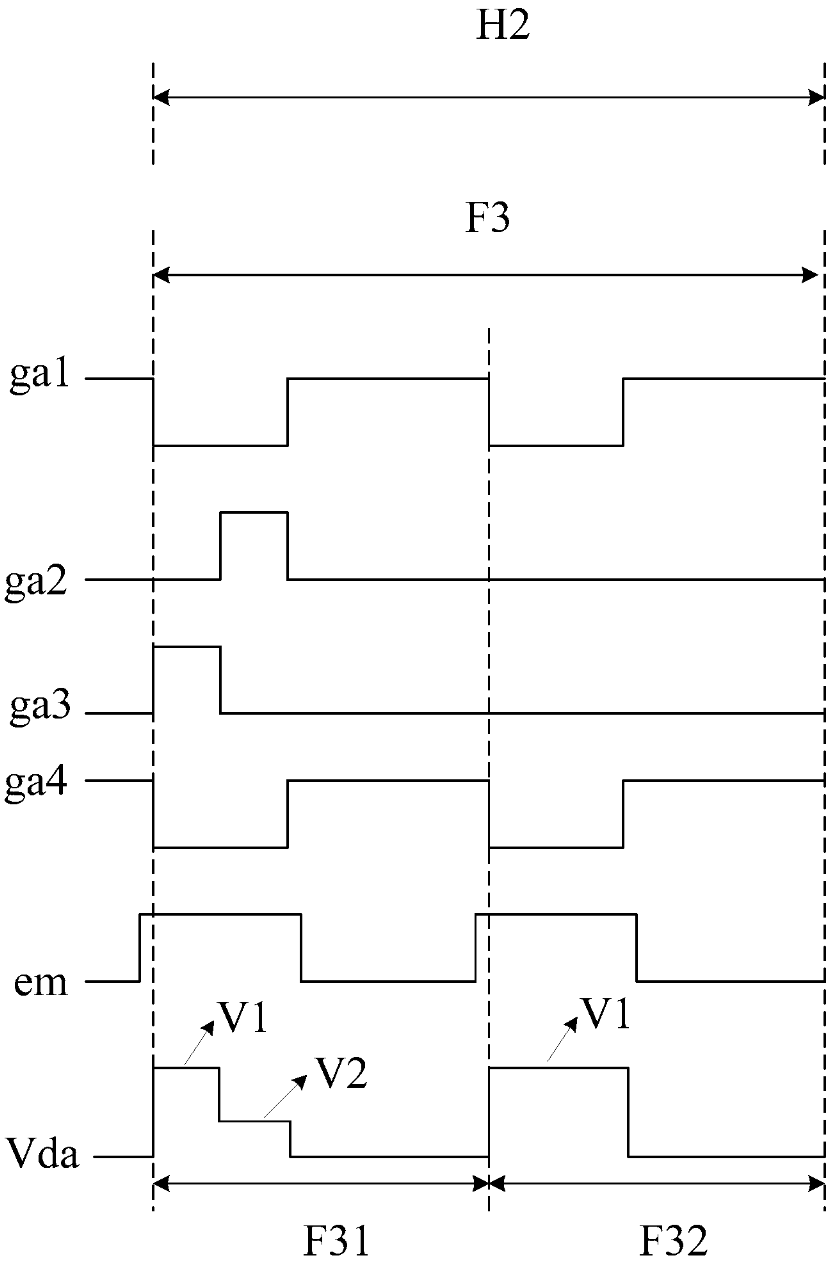
FIG. 5B is some other signal sequence diagrams provided by an embodiment of the present disclosure.

Exemplarily, in combination with FIG. 4, FIG. 5A and FIG. 5B, the current refresh frequency H1 corresponding to the display frames F1-F2 is 120 Hz, and then the current refresh frequency H1 is the maximum refresh frequency. The current refresh frequency H2 corresponding to the display frame F3 is 60 Hz, and then the current refresh frequency H2 is ½ of the maximum refresh frequency, and the display frame F3 may be divided into 2 sub-display frames F31 and F32. The sub-display frame F31 is defined as a refresh sub-frame, and the sub-display frame F32 is defined as a holding sub-frame. The signal ga1 loaded by the first control signal end GA1 includes an active level (e.g., a high level) and an inactive level (e.g., a low level) in the sub-display frame F31, the signal ga2 loaded by the second control signal end GA2 includes an active level (e.g., a high level) and an inactive level (e.g., a low level) in the sub-display frame F31, the signal ga3 loaded by the third control signal end GA3 includes an active level (e.g., a high level) and an inactive level (e.g., a low level) in the sub-display frame F31, the signal ga4 loaded by the fourth control signal end GA4 includes an active level (e.g., a high level) and an inactive level (e.g., a low level) in the sub-display frame F31, and the signal em loaded by the light emitting control signal end EM includes an active level (e.g., a low level) and an inactive level (e.g., a high level) in the sub-display frame F31. The signal ga1 loaded by the first control signal end GA1 includes an active level (e.g., a high level) and an inactive level (e.g., a low level) in the sub-display frame F32, the signal ga4 loaded by the fourth control signal end GA4 includes an active level (e.g., a high level) and an inactive level (e.g., a low level) in the sub-display frame F32, the signal em loaded by the light emitting control signal end EM includes an active level (e.g., a low level) and an inactive level (e.g., a high level) in the sub-display frame F32, the signal ga2 loaded by the second control signal end GA2 includes an inactive level (e.g., a low level) in the sub-display frame F32, and the signal ga3 loaded by the third control signal end GA3 includes an inactive level (e.g., a low level) in the sub-display frame F32.

The current refresh frequency H3 corresponding to the display frame F4 is 30 Hz, and then the current refresh frequency H3 is ¼ of the maximum refresh frequency, and the display frame F4 may be divided into 4 sub-display frames F41, F42, F43 and F44. The sub-display frame F41 is defined as a refresh sub-frame, and the sub-display frames F42-F44 are defined as holding sub-frames. The signal ga1 loaded by the first control signal end GA1 includes an active level (e.g., a high level) and an inactive level (e.g., a low level) in the sub-display frame F41, the signal ga2 loaded by the second control signal end GA2 includes an active level (e.g., a high level) and an inactive level (e.g., a low level) in the sub-display frame F41, the signal ga3 loaded by the third control signal end GA3 includes an active level (e.g., a high level) and an inactive level (e.g., a low level) in the sub-display frame F41, the signal ga4 loaded by the fourth control signal end GA4 includes an active level (e.g., a high level) and an inactive level (e.g., a low level) in the sub-display frame F41, and the signal em loaded by the light emitting control signal end EM includes an active level (e.g., a low level) and an inactive level (e.g., a high level) in the sub-display frame F41. The signal ga1 loaded by the first control signal end GA1 includes an active level (e.g., a high level) and an inactive level (e.g., a low level) in the sub-display frame F42, the signal ga4 loaded by the fourth control signal end GA4 includes an active level (e.g., a high level) and an inactive level (e.g., a low level) in the sub-display frame F42, the signal em loaded by the light emitting control signal end EM includes an active level (e.g., a low level) and an inactive level (e.g., a high level) in the sub-display frame F42, the signal ga2 loaded by the second control signal end GA2 includes an inactive level (e.g., a low level) in the sub-display frame F42, and the signal ga3 loaded by the third control signal end GA3 includes an inactive level (e.g., a low level) in the sub-display frame F42. The signal ga1 loaded by the first control signal end GA1 includes an active level (e.g., a high level) and an inactive level (e.g., a low level) in the sub-display frame F43, the signal ga4 loaded by the fourth control signal end GA4 includes an active level (e.g., a high level) and an inactive level (e.g., a low level) in the sub-display frame F43, the signal em loaded by the light emitting control signal end EM includes an active level (e.g., a low level) and an inactive level (e.g., a high level) in the sub-display frame F43, the signal ga2 loaded by the second control signal end GA2 includes an inactive level (e.g., a low level) in the sub-display frame F43, and the signal ga3 loaded by the third control signal end GA3 includes an inactive level (e.g., a low level) in the sub-display frame F43. The signal ga1 loaded by the first control signal end GA1 includes an active level (e.g., a high level) and an inactive level (e.g., a low level) in the sub-display frame F44, the signal ga4 loaded by the fourth control signal end GA4 includes an active level (e.g., a high level) and an inactive level (e.g., a low level) in the sub-display frame F44, the signal em loaded by the light emitting control signal end EM includes an active level (e.g., a low level) and an inactive level (e.g., a high level) in the sub-display frame F44, the signal ga2 loaded by the second control signal end GA2 includes an inactive level (e.g., a low level) in the sub-display frame F44, and the signal ga3 loaded by the third control signal end GA3 includes an inactive level (e.g., a low level) in the sub-display frame F44.

In some embodiments of the present disclosure, when the signal loaded by the first control signal end GA1 is the active level, the signal loaded by the light emitting control signal end EM may also be the active level. For example, as shown in FIG. 5A and FIG. 5B, when the signal ga1 loaded by the first control signal end GA1 is the low level, the signal em loaded by the light emitting control signal end EM is the high level.

Exemplarily, in combination with FIG. 5B, in the refresh sub-frame F31, when the signal ga1 loaded by the first control signal end GA1 is the active level (e.g., the low level), the signal ga2 loaded by the second control signal end GA2 is the inactive level (e.g., the low level), the signal ga3 loaded by the third control signal end GA3 is the active level (e.g., the high level), the signal ga4 loaded by the fourth control signal end GA4 is the active level (e.g., the low level) and the signal em loaded by the light emitting control signal end EM is the inactive level (e.g., the high level), the voltage control circuit may provide a fixed voltage V1 of a signal Vda loaded by the data signal end DA to the second electrode of the driving transistor so as to reset the second electrode of the driving transistor. A first reset circuit may provide a first initialization voltage of a first initialization signal end to the gate of the driving transistor so as to reset the gate of the driving transistor. The second reset circuit may provide a second initialization voltage of a second initialization signal end to the anode of the light emitting device so as to reset the anode of the light emitting device.

When the signal ga1 loaded by the first control signal end GA1 is the active level (e.g., the low level), the signal ga2 loaded by the second control signal end GA2 is the active level (e.g., the high level), the signal ga3 loaded by the third control signal end GA3 is the inactive level (e.g., the low level), the signal ga4 loaded by the fourth control signal end GA4 is the active level (e.g., the low level) and the signal em loaded by the light emitting control signal end EM is the inactive level (e.g., the high level), the voltage control circuit may provide the data voltage V2 of the signal Vda loaded by the data signal end DA to the second electrode of the driving transistor so as to charge the gate of the driving transistor. The second reset circuit may provide the second initialization voltage of the second initialization signal end to the anode of the light emitting device so as to reset the anode of the light emitting device.

When the signal ga1 loaded by the first control signal end GA1 is the inactive level (e.g., the high level), the signal ga2 loaded by the second control signal end GA2 is the inactive level (e.g., the low level), the signal ga3 loaded by the third control signal end GA3 is the inactive level (e.g., the low level), the signal ga4 loaded by the fourth control signal end GA4 is the inactive level (e.g., the high level) and the signal em loaded by the light emitting control signal end EM is the active level (e.g., the low level), the light emitting control circuit may conduct a first power end and the first electrode of the driving transistor, conduct the second electrode of the driving transistor with the anode of the light emitting device and provide the current produced by the driving transistor to the light emitting device.

In the holding sub-frame F32, when the signal ga1 loaded by the first control signal end GA1 is the active level (e.g., the low level), the signal ga2 loaded by the second control signal end GA2 is the inactive level (e.g., the low level), the signal ga3 loaded by the third control signal end GA3 is the inactive level (e.g., the low level), the signal ga4 loaded by the fourth control signal end GA4 is the active level (e.g., the low level) and the signal em loaded by the light emitting control signal end EM is the inactive level (e.g., the high level), the voltage control circuit may provide the fixed voltage V1 of the signal Vda loaded by the data signal end DA to the second electrode of the driving transistor so as to reset the second electrode of the driving transistor. The second reset circuit may provide the second initialization voltage of the second initialization signal end to the anode of the light emitting device so as to reset the anode of the light emitting device.

When the signal ga1 loaded by the first control signal end GA1 is the inactive level (e.g., the high level), the signal ga2 loaded by the second control signal end GA2 is the inactive level (e.g., the low level), the signal ga3 loaded by the third control signal end GA3 is the inactive level (e.g., the low level), the signal ga4 loaded by the fourth control signal end GA4 is the inactive level (e.g., the high level) and the signal em loaded by the light emitting control signal end EM is the active level (e.g., the low level), the light emitting control circuit may conduct the first power end and the first electrode of the driving transistor, conduct the second electrode of the driving transistor with the anode of the light emitting device and provide the current produced by the driving transistor to the light emitting device.

A working process of the pixel circuit provided by some embodiments of the present disclosure is explained and described below in combination with FIG. 4 to FIG. 5B. It should be noted that the present embodiment is for better explaining the present disclosure, without limiting the present disclosure.

In the display frame F1, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the high level, and the fifth transistor M5 may be controlled to be conducted. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage V1 of the signal V2 loaded by the data signal end DA to the second electrode m2 of the driving transistor M0 so as to reset the second electrode m2 of the driving transistor M0. The conducted fifth transistor M5 may provide the first initialization voltage loaded by the first initialization signal end VINIT1 to the gate of the driving transistor M0 so as to reset the gate of the driving transistor M0. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the low level, and the first transistor M1 may be controlled to be conducted. The signal ga2 loaded by the second control signal end GA2 is the high level, and the second transistor M2 may be controlled to be conducted. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the data voltage V2 of the signal V2 loaded by the data signal end DA to the second electrode m2 of the driving transistor M0, and the gate of the driving transistor M0 is charged through the conducted second transistor M2 so as to change the voltage of the gate of the driving transistor M0 to: V2+Vth.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide a voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]^2=K[V2-Vdd]^2$. The current IL may be provided to the anode of the light emitting device L through the conducted fourth transistor M4, and a second power end VSS also loads a corresponding voltage so as to make the light emitting device L to emit light.

In the display frame F2, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the high level, and the fifth transistor M5 may be controlled to be conducted. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage V1 of the signal V2 loaded by the data signal end DA to the second electrode m2 of the driving transistor M0 so as to reset the second electrode m2 of the driving transistor M0. The conducted fifth transistor M5 may provide the first initialization voltage loaded by the first initialization signal end VINIT1 to the gate of the driving transistor M0 so as to reset the gate of the driving transistor M0. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the low level, and the first transistor M1 may be controlled to be conducted. The signal ga2 loaded by the second control signal end GA2 is the high level, and the second transistor M2 may be controlled to be conducted. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the data voltage V2 of the signal V2 loaded by the data signal end DA to the second electrode m2 of the driving transistor M0, and the gate of the driving transistor M0 is charged through the conducted second transistor M2 so as to change the voltage of the gate of the driving transistor M0 to: V2+Vth.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide the voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]^2=K[V2-Vdd]^2$. The current IL may be provided to the anode of the light emitting device L through the conducted fourth transistor M4, and the second power end VSS also loads a corresponding voltage so as to make the light emitting device L to emit light.

In the sub-display frame F31 of the display frame F3, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the high level, and the fifth transistor M5 may be controlled to be conducted. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage V1 of the signal V2 loaded by the data signal end DA to the second electrode m2 of the driving transistor M0 so as to reset the second electrode m2 of the driving transistor M0. The conducted fifth transistor M5 may provide the first initialization voltage loaded by the first initialization signal end VINIT1 to the gate of the driving transistor M0 so as to reset the gate of the driving transistor M0. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the low level, and the first transistor M1 may be controlled to be conducted. The signal ga2 loaded by the second control signal end GA2 is the high level, and the second transistor M2 may be controlled to be conducted. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the data voltage V2 of the signal V2 loaded by the data signal end DA to the second electrode m2 of the driving transistor M0, and the gate of the driving transistor M0 is charged through the conducted second transistor M2 so as to change the voltage of the gate of the driving transistor M0 to: V2+Vth.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide the voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]^2=K[V2-Vdd]^2$. The current IL may be provided to the anode of the light emitting device L through the conducted fourth transistor M4, and the second power end VSS also loads a corresponding voltage so as to make the light emitting device L to emit light.

In the sub-display frame F32 of the display frame F3, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage of the signal V2 loaded by the data signal end DA to the second electrode m2 of the driving transistor M0 so as to reset the second electrode m2 of the driving transistor M0 to lower the hysteresis effect. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide the voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]^2=K[V2-Vdd]^2$. The current IL may be provided to the anode of the light emitting device L through the conducted fourth transistor M4, and the second power end VSS also loads a corresponding voltage so as to make the light emitting device L to emit light.

In the sub-display frame F41 of the display frame F4, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the high level, and the fifth transistor M5 may be controlled to be conducted. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage of the signal V2 loaded by the data signal end DA to the second electrode m2 of the driving transistor M0 so as to reset the second electrode m2 of the driving transistor M0. The conducted fifth transistor M5 may provide the first initialization voltage loaded by the first initialization signal end VINIT1 to the gate of the driving transistor M0 so as to reset the gate of the driving transistor M0. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the low level, and the first transistor M1 may be controlled to be conducted. The signal ga2 loaded by the second control signal end GA2 is the high level, and the second transistor M2 may be controlled to be conducted. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the data voltage V2 of the signal V2 loaded by the data signal end DA to the second electrode m2 of the driving transistor M0, and the gate of the driving transistor M0 is charged through the conducted second transistor M2 so as to change the voltage of the gate of the driving transistor M0 to: V2+Vth.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide the voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]^2=K[V2-Vdd]^2$. The current IL may be provided to the anode of the light emitting device L through the conducted fourth transistor M4, and the second power end VSS also loads a corresponding voltage so as to make the light emitting device L to emit light.

In the sub-display frame F42 of the display frame F4, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage of the signal V2 loaded by the data signal end DA to the second electrode m2 of the driving transistor M0 so as to reset the second electrode m2 of the driving transistor M0 to lower the hysteresis effect. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide the voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]2=K[V2-Vdd]^2$. The current IL may be provided to the anode of the light emitting device L through the conducted fourth transistor M4, and the second power end VSS also loads a corresponding voltage so as to make the light emitting device L to emit light.

In the sub-display frame F43 of the display frame F4, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage of the signal V2 loaded by the data signal end DA to the second electrode m2 of the driving transistor M0 so as to reset the second electrode m2 of the driving transistor M0 to lower the hysteresis effect. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide the voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]^2=K[V2-Vdd]^2$. The current IL may be provided to the anode of the light emitting device L through the conducted fourth transistor M4, and the second power end VSS also loads a corresponding voltage so as to make the light emitting device L to emit light.

In the sub-display frame F44 of the display frame F4, first, the signal ga1 loaded by the first control signal end GA1 is the low level, and the first transistor M1 may be controlled to be conducted. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the low level, and the sixth transistor M6 may be controlled to be conducted. The signal em loaded by the light emitting control signal end EM is the high level, and the third transistor M3 and the fourth transistor M4 may be controlled to be cut off. The conducted first transistor M1 may provide the fixed voltage of the signal V2 loaded by the data signal end DA to the second electrode m2 of the driving transistor M0 so as to reset the second electrode m2 of the driving transistor M0 to lower the hysteresis effect. The conducted sixth transistor M6 may provide the second initialization voltage of the second initialization signal end VINIT2 to the anode of the light emitting device L so as to reset the anode of the light emitting device L.

Afterwards, the signal ga1 loaded by the first control signal end GA1 is the high level, and the first transistor M1 may be controlled to be cut off. The signal ga2 loaded by the second control signal end GA2 is the low level, and the second transistor M2 may be controlled to be cut off. The signal ga3 loaded by the third control signal end GA3 is the low level, and the fifth transistor M5 may be controlled to be cut off. The signal ga4 loaded by the fourth control signal end GA4 is the high level, and the sixth transistor M6 may be controlled to be cut off. The signal em loaded by the light emitting control signal end EM is the low level, and the third transistor M3 and the fourth transistor M4 may be controlled to be conducted. The conducted third transistor M3 may provide the voltage Vdd loaded by the first power end VDD to the first electrode m1 of the driving transistor M0 so as to make the voltage of the first electrode m1 of the driving transistor M0 be Vdd. The voltage of the gate of the driving transistor M0 is kept to be V2+Vth through the storage capacitor, and then the driving transistor M0 is in a saturated state, so that the produced current is $IL=K[V2+Vth-Vdd-Vth]^2=K[V2-Vdd]^2$. The current IL may be provided to the anode of the light emitting device L through the conducted fourth transistor M4, and the second power end VSS also loads a corresponding voltage so as to make the light emitting device L to emit light.

It should be noted that, the fixed voltage V1 of the signal V2 loaded by the data signal end DA may be a positive voltage. For example, it may be $0\ V<V1\leq 8\ V$. Further, it may be $5\ V\leq V1\leq 6\ V$. Exemplarily, it may be V1=8 V, or V1=7 V, or V1=6 V, or V1=5 V, or V1=4 V, or V1=3 V, or V1=2 V or V1=1 V. Of course, in practical applications, a specific value of V1 may be determined according to the requirements of the practical applications, which is not limited here.

It should be noted that, the second initialization voltage Vinit2 meets a following relation: $Vinit2-Vss<Voled$. Voled represents a light emitting threshold voltage of the light emitting device L, and when a voltage between the anode and a cathode of the light emitting device L is greater than Voled, the light emitting device L may emit light.

Figure 6:
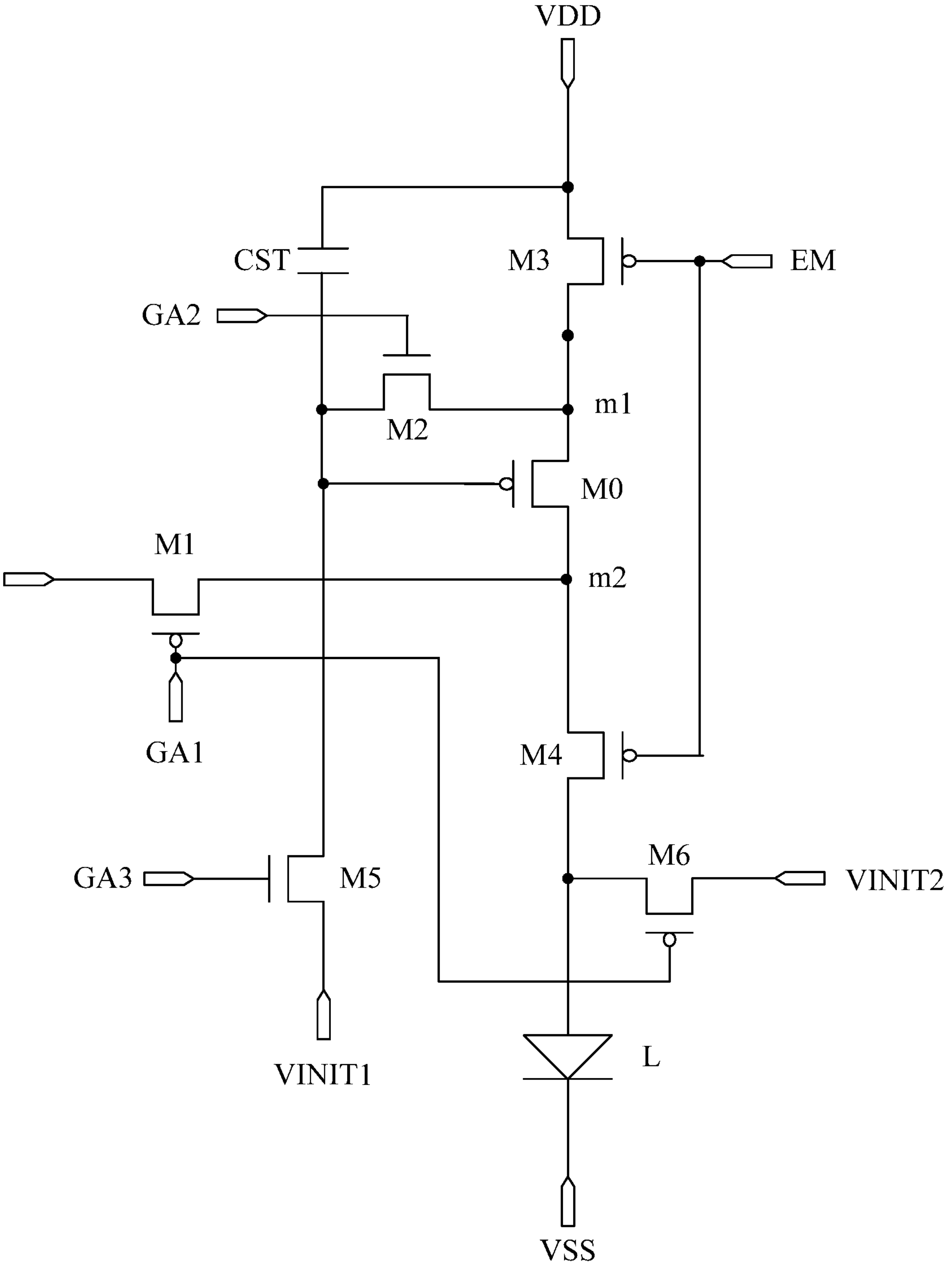
FIG. 6 is some other specific schematic structural diagrams of a pixel circuit provided by an embodiment of the present disclosure.

An embodiment of the present disclosure provides schematic structural diagrams of other pixel circuits, and as shown in FIG. 6, transformation is performed on the implementation in the above embodiments. Only the difference between the present embodiment and the above embodiments is explained below, and similarities are omitted here.

In some embodiments of the present disclosure, the first control signal end GA1 and the fourth control signal end GA4 may be arranged as the same signal end. Therefore, the quantity of signal lines may be reduced, and the space occupied for wiring may be saved.

Exemplarily, as shown in FIG. 6, a gate of the first transistor M1 and a gate of the sixth transistor M6 may be made to be both coupled to the first control signal end GA1.

In some embodiments of the present disclosure, the first initialization signal end VINIT1 and the second initialization signal end VINIT2 may be arranged as the same signal end.

Therefore, the quantity of signal lines may be reduced, and the space occupied for wiring may be saved.

Figure 7:
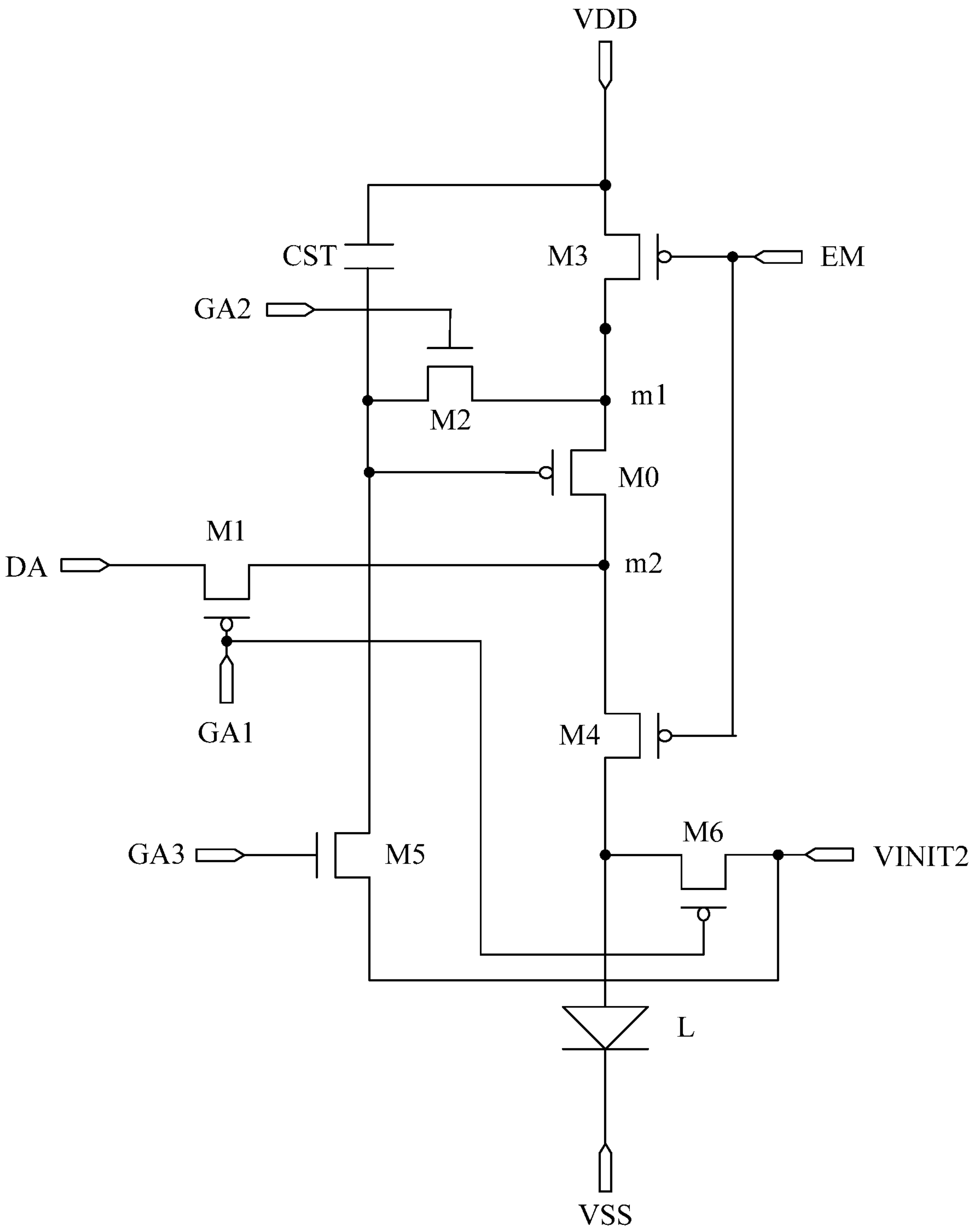
FIG. 7 is yet some specific schematic structural diagrams of a pixel circuit provided by an embodiment of the present disclosure.

Exemplarily, as shown in FIG. 7, a first electrode of the fifth transistor M5 and a first electrode of the sixth transistor M6 may be made to be both coupled to the second initialization signal end VINIT2.

It should be noted that, signal sequence diagrams corresponding to the pixel circuits shown in FIG. 6 and FIG. 7 may be FIG. 5A. A specific working process of the pixel circuits shown in FIG. 6 and FIG. 7 may be basically the same as the specific working process of the pixel circuit shown in FIG. 4, which is not repeated here.

An embodiment of the present disclosure further provides a display apparatus, including the above pixel circuit provided by the embodiment of the present disclosure. The principle for solving problems of the display apparatus is similar to that of the aforementioned pixel circuit, and thus the implementation of the display apparatus can refer to the implementation of the aforementioned pixel circuit, and repetitions are omitted here.

During specific implementation, in the embodiment of the present disclosure, the display apparatus may be: a mobile phone, a tablet computer, a television, a display, a laptop, a digital photo frame, a navigator and any product or component with a display function. Other essential components of the display apparatus shall be understood by those of ordinary skill in the art, are omitted herein, and also shall not become a restriction to the present disclosure.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including, but not limited to, a disk memory, a CD-ROM, an optical memory and the like) containing computer available program codes.

The present disclosure is described with reference to the flow diagrams and/or block diagrams of the method, device (system), and computer program product according to the embodiments of the present disclosure. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow diagram and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

Although the preferred embodiments of the present disclosure have been described, those skilled in the art can make additional changes and modifications on these embodiments once they know the basic creative concept. So the appended claims are intended to be construed to include the preferred embodiments and all changes and modifications that fall into the scope of the present disclosure.

Apparently, those skilled in the art can make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A pixel circuit, comprising:

a light emitting device;

a driving transistor configured to produce a current for driving the light emitting device to emit light according to a data voltage;

a voltage control circuit coupled to the driving transistor, wherein the voltage control circuit is configured to reset the driving transistor and input the data voltage in response to a loaded signal; and a light emitting control circuit coupled to the driving transistor and the light emitting device, wherein the light emitting control circuit is configured to provide the current produced by the driving transistor to the light emitting device, wherein a frequency of resetting the driving transistor is not less than a frequency of inputting the data voltage;

wherein the voltage control circuit is further configured to provide a fixed voltage loaded by a data signal end to the driving transistor in response to a signal loaded by a first control signal end, reset the driving transistor and provide a data voltage loaded by the data signal end to the driving transistor in response to signals loaded by the first control signal end and a second control signal end;

wherein the voltage control circuit comprises: a first transistor, a second transistor and a storage capacitor;

a gate of the first transistor is coupled to the first control signal end, a first electrode of the first transistor is coupled to the data signal end, and a second electrode of the first transistor is coupled to a second electrode of the driving transistor;

a gate of the second transistor is coupled to the second control signal end, a first electrode of the second transistor is coupled to a gate of the driving transistor, and a second electrode of the second transistor is coupled to a first electrode of the driving transistor; and a first electrode plate of the storage capacitor is coupled to a first power end, and a second electrode plate of the storage capacitor is coupled to the gate of the driving transistor.

2. The pixel circuit according to claim 1, wherein in response to the pixel circuit working at a current refresh frequency among a plurality of different refresh frequencies, a refresh frequency corresponding to the signal loaded by the first control signal end is a set refresh frequency, and a refresh frequency corresponding to the signal of the second control signal end is the current refresh frequency, wherein the set refresh frequency is not less than the current refresh frequency.

3. The pixel circuit according to claim 2, wherein the current refresh frequency is less than a maximum refresh frequency among the plurality of different refresh frequencies; and the set refresh frequency is greater than the current refresh frequency.

4. The pixel circuit according to claim 3, wherein a current display frame of the pixel circuit working at the current refresh frequency is divided into a plurality of consecutive sub-display frames, the first sub-display frame of the plurality of sub-display frames is defined as a refresh sub-frame, and the remaining sub-display frames are defined as holding sub-frames;

in the refresh sub-frame, the signal loaded by the first control signal end comprises a first active level and a first inactive level; the signal loaded by the second control signal end comprises a second active level and a second inactive level; the signal loaded by the third control signal end comprises a third active level and a third inactive level; and the signal loaded by the fourth control signal end comprises an fourth active level and a fourth inactive level, wherein in the refresh sub-frame, in response to the signal loaded by the first control signal end being the first active level, the signal loaded by the second control signal end being the second inactive level, the signal loaded by the third control signal end being the third active level and the signal loaded by the fourth control signal end being the fourth active level, the voltage control circuit is configured to reset the driving transistor, and the second reset circuit is configured to reset the anode of the light emitting device;

in response to the signal loaded by the first control signal end being the first active level, the signal loaded by the second control signal end being the second active level, the signal loaded by the third control signal end being the third inactive level and the signal loaded by the fourth control signal end being the fourth active level, the voltage control circuit is configured to input the data voltage loaded by the data signal end, and the second reset circuit is configured to reset the anode of the light emitting device; and in response to the signal loaded by the first control signal end being the first inactive level, the signal loaded by the second control signal end being the second inactive level, the signal loaded by the third control signal end being the third inactive level and the signal loaded by the fourth control signal end being the fourth inactive level, the light emitting control circuit is configured to provide the current produced by the driving transistor to the light emitting device.

5. The pixel circuit according to claim 4, wherein in the holding sub-frames, the signal loaded by the first control signal end comprises a fifth active level and a fifth inactive level; the signal loaded by the second control signal end comprises a sixth inactive level; the signal loaded by the third control signal end comprises a seventh inactive level; and the signal loaded by the fourth control signal end comprises an eighth active level and an eighth inactive level, wherein in the holding sub-frames, in response to the signal loaded by the first control signal end being the fifth active level, the signal loaded by the second control signal end being the sixth inactive level, the signal loaded by the third control signal end being the seventh inactive level and the signal loaded by the fourth control signal end being the eighth active level, the voltage control circuit is configured to reset the driving transistor, and the second reset circuit is configured to reset the anode of the light emitting device; and in response to the signal loaded by the first control signal end being the fifth inactive level, the signal loaded by the second control signal end being the sixth inactive level, the signal loaded by the third control signal end being the seventh inactive level and the signal loaded by the fourth control signal end being the eighth inactive level, the light emitting control circuit is configured to provide the current produced by the driving transistor to the light emitting device.

6. The pixel circuit according to claim 1, further comprises a first reset circuit and a second reset circuit;

the first reset circuit is configured to reset a gate of the driving transistor in response to a signal of a third control signal end; and the second reset circuit is configured to reset an anode of the light emitting device in response to a signal of a fourth control signal end.

7. The pixel circuit according to claim 6, wherein in response to the pixel circuit working at the current refresh frequency among the plurality of different refresh frequencies, a refresh frequency corresponding to the signal loaded by the fourth control signal end is a set refresh frequency, and a refresh frequency corresponding to the signal of the third control signal end is the current refresh frequency, wherein the set refresh frequency is not less than the current refresh frequency.

8. The pixel circuit according to claim 6, wherein the first reset circuit comprises: a fifth transistor; a gate of the fifth transistor is coupled to the third control signal end, a first electrode of the fifth transistor is coupled to a first initialization signal end, and a second electrode of the fifth transistor is coupled to the gate of the driving transistor; and the second reset circuit comprises: a sixth transistor; and a gate of the sixth transistor is coupled to the fourth control signal end, a first electrode of the sixth transistor is coupled to a second initialization signal end, and a second electrode of the sixth transistor is coupled to the light emitting device.

9. The pixel circuit according to claim 6, wherein the first control signal end and the fourth control signal end are an identical signal end.

10. The pixel circuit according to claim 1, wherein the light emitting control circuit comprises: a third transistor and a fourth transistor;

a gate of the third transistor is coupled to a light emitting control signal end, a first electrode of the third transistor is coupled to a first power end, and a second electrode of the third transistor is coupled to the first electrode of the driving transistor; and a gate of the fourth transistor is coupled to the light emitting control signal end, a first electrode of the fourth transistor is coupled to a second electrode of the driving transistor, and a second electrode of the fourth transistor is coupled to the light emitting device.

11. The pixel circuit according to claim 1, wherein a material of an active layer of the transistors in the pixel circuit comprises at least one of a metal oxide semiconductor material or a low temperature poly-silicon semiconductor material.

12. A driving method of the pixel circuit according to claim 1, comprising:

resetting, by a voltage control circuit, a driving transistor in response to a loaded signal;

inputting, by the voltage control circuit, a data voltage in response to a loaded signal; and providing, by a light emitting control signal end, a current produced by the driving transistor to a light emitting device, wherein a frequency of resetting the driving transistor is not less than a frequency of inputting the data voltage.

13. A display apparatus, comprising a pixel circuit; the pixel circuit comprises:

a light emitting device;

a driving transistor configured to produce a current for driving the light emitting device to emit light according to a data voltage;

a voltage control circuit coupled to the driving transistor, wherein the voltage control circuit is configured to reset the driving transistor and input the data voltage in response to a loaded signal; and a light emitting control circuit coupled to the driving transistor and the light emitting device, wherein the light emitting control circuit is configured to provide the current produced by the driving transistor to the light emitting device, wherein a frequency of resetting the driving transistor is not less than a frequency of inputting the data voltage;

wherein the voltage control circuit is further configured to provide a fixed voltage loaded by a data signal end to the driving transistor in response to a signal loaded by a first control signal end, reset the driving transistor and provide a data voltage loaded by the data signal end to the driving transistor in response to signals loaded by the first control signal end and a second control signal end;

wherein the voltage control circuit comprises: a first transistor, a second transistor and a storage capacitor;

a gate of the first transistor is coupled to the first control signal end, a first electrode of the first transistor is coupled to the data signal end, and a second electrode of the first transistor is coupled to a second electrode of the driving transistor;

a gate of the second transistor is coupled to the second control signal end, a first electrode of the second transistor is coupled to a gate of the driving transistor, and a second electrode of the second transistor is coupled to a first electrode of the driving transistor; and a first electrode plate of the storage capacitor is coupled to a first power end, and a second electrode plate of the storage capacitor is coupled to the gate of the driving transistor.

14. The display apparatus according to claim 13, wherein the voltage control circuit is further configured to provide a fixed voltage loaded by a data signal end to the driving transistor in response to a signal loaded by a first control signal end, reset the driving transistor and provide a data voltage loaded by the data signal end to the driving transistor in response to signals loaded by the first control signal end and a second control signal end.

15. The display apparatus according to claim 14, wherein in response to the pixel circuit working at a current refresh frequency among a plurality of different refresh frequencies, a refresh frequency corresponding to the signal loaded by the first control signal end is a set refresh frequency, and a refresh frequency corresponding to the signal of the second control signal end is the current refresh frequency, wherein the set refresh frequency is not less than the current refresh frequency.

16. The display apparatus according to claim 15, wherein the current refresh frequency is less than a maximum refresh frequency among the plurality of different refresh frequencies; and the set refresh frequency is greater than the current refresh frequency.

17. The display apparatus according to claim 14, further comprises a first reset circuit and a second reset circuit;

the first reset circuit is configured to reset a gate of the driving transistor in response to a signal of a third control signal end; and the second reset circuit is configured to reset an anode of the light emitting device in response to a signal of a fourth control signal end.

18. The display apparatus according to claim 17, wherein in response to the pixel circuit working at the current refresh frequency among the plurality of different refresh frequencies, a refresh frequency corresponding to the signal loaded by the fourth control signal end is a set refresh frequency, and a refresh frequency corresponding to the signal of the third control signal end is the current refresh frequency, wherein the set refresh frequency is not less than the current refresh frequency.

* * * * *